United States Patent
Adachi et al.

(10) Patent No.: US 11,960,445 B2
(45) Date of Patent: Apr. 16, 2024

(54) FILE MANAGEMENT DEVICE

(71) Applicant: FANUC CORPORATION, Yamanashi (JP)

(72) Inventors: Hideaki Adachi, Yamanashi (JP); Takahiro Endou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 404 days.

(21) Appl. No.: 16/807,324

(22) Filed: Mar. 3, 2020

(65) Prior Publication Data

US 2020/0371996 A1 Nov. 26, 2020

(30) Foreign Application Priority Data

May 22, 2019 (JP) .................................. 2019-095910

(51) Int. Cl.
  *G06F 11/14* (2006.01)
  *G06F 16/16* (2019.01)

(52) U.S. Cl.
  CPC ........ *G06F 16/162* (2019.01); *G06F 11/1451* (2013.01); *G06F 11/1456* (2013.01); *G06F 11/1458* (2013.01)

(58) Field of Classification Search
  CPC ............... G06F 11/008; G06F 11/1004; G06F 11/1666; G06F 11/1448; G06F 11/1464; G06F 11/1451; G06F 11/1456; G06F 11/1458; G06F 11/1453; G06F 11/1469; G06F 11/0721; G06F 11/004
  See application file for complete search history.

(56) References Cited

U.S. PATENT DOCUMENTS

| 6,430,662 | B1 * | 8/2002 | Hurich | G11C 16/105 711/162 |
| 10,437,983 | B1 * | 10/2019 | Fessel | G06F 21/6218 |
| 2002/0042859 | A1 * | 4/2002 | Lowry | G06F 21/6218 711/100 |
| 2002/0042892 | A1 * | 4/2002 | Gold | G06F 11/1417 714/E11.133 |
| 2003/0043627 | A1 * | 3/2003 | Moschopoulos | G11C 16/10 365/185.11 |
| 2003/0078948 | A1 * | 4/2003 | Otsuka | G06F 11/1458 714/E11.12 |
| 2003/0081468 | A1 * | 5/2003 | Kubiak | G06F 11/1008 714/E11.035 |
| 2003/0229653 | A1 * | 12/2003 | Nakanishi | G06F 11/1461 |

(Continued)

FOREIGN PATENT DOCUMENTS

JP H06110538 A 4/1994
JP H09-034531 A 2/1997
(Continued)

*Primary Examiner* — Kamini B Patel
(74) *Attorney, Agent, or Firm* — Maier & Maier, PLLC

(57) ABSTRACT

A file management device is a file management device that is connected to a plurality of manufacturing machines or a plurality of robots through a communication network and includes: an input unit to which a user inputs a file deletion command including a file name of files to be deleted; and a file deletion unit that causes the plurality of manufacturing machines or the plurality of robots to delete the files to be deleted with the same file name stored in the plurality of manufacturing machines or the plurality of robots in response to the file deletion command input through the input unit.

14 Claims, 9 Drawing Sheets

(56) References Cited

U.S. PATENT DOCUMENTS

| | | | |
|---|---|---|---|
| 2004/0078602 A1* | 4/2004 | Rothbarth | G06F 11/1448 |
| | | | 713/165 |
| 2004/0153471 A1* | 8/2004 | Saika | G06F 11/3466 |
| | | | 714/E11.2 |
| 2005/0021950 A1* | 1/2005 | Rothbarth | G06F 11/1458 |
| | | | 713/165 |
| 2005/0165867 A1* | 7/2005 | Barton | G06F 11/1464 |
| 2005/0273476 A1* | 12/2005 | Wertheimer | G06F 11/1458 |
| 2006/0010227 A1* | 1/2006 | Atluri | H04L 67/1095 |
| | | | 709/217 |
| 2009/0112950 A1* | 4/2009 | Ejiri | G06F 16/166 |
| 2010/0023156 A1 | 1/2010 | Trepina et al. | |
| 2010/0306586 A1* | 12/2010 | Hanaoka | G06F 11/1441 |
| | | | 714/E11.119 |
| 2011/0218965 A1* | 9/2011 | Lee | G06Q 10/10 |
| | | | 709/217 |
| 2012/0023233 A1* | 1/2012 | Okamoto | G06F 9/45558 |
| | | | 709/226 |
| 2014/0181033 A1 | 6/2014 | Pawar et al. | |
| 2014/0181037 A1* | 6/2014 | Pawar | G06F 11/1474 |
| | | | 707/648 |
| 2016/0033955 A1* | 2/2016 | Satake | G05B 23/0272 |
| | | | 700/174 |
| 2016/0378866 A1* | 12/2016 | Matsuo | G06F 16/951 |
| | | | 707/722 |
| 2017/0161049 A1* | 6/2017 | Kim | H04L 47/826 |
| 2018/0032404 A1* | 2/2018 | Komatsu | G06F 11/1448 |
| 2018/0088818 A1* | 3/2018 | Sakurai | G06F 11/2097 |
| 2018/0150064 A1* | 5/2018 | Ishigure | G05B 19/408 |
| 2020/0341450 A1* | 10/2020 | Isobe | G05B 19/4063 |

FOREIGN PATENT DOCUMENTS

| | | |
|---|---|---|
| JP | H11-110029 A | 4/1999 |
| JP | 2000-020368 A | 1/2000 |
| JP | 2000020367 A | 1/2000 |
| JP | 2001-014017 A | 1/2001 |
| JP | 2002-236513 A | 8/2002 |
| JP | 2005284804 A | 10/2005 |
| JP | 2009-070268 A | 4/2009 |
| JP | 2014235443 A | 12/2014 |
| JP | 2016-071407 A | 5/2016 |
| JP | 2017167811 A | 9/2017 |
| JP | 2018-018429 A | 2/2018 |
| JP | 2018097533 A | 6/2018 |

* cited by examiner

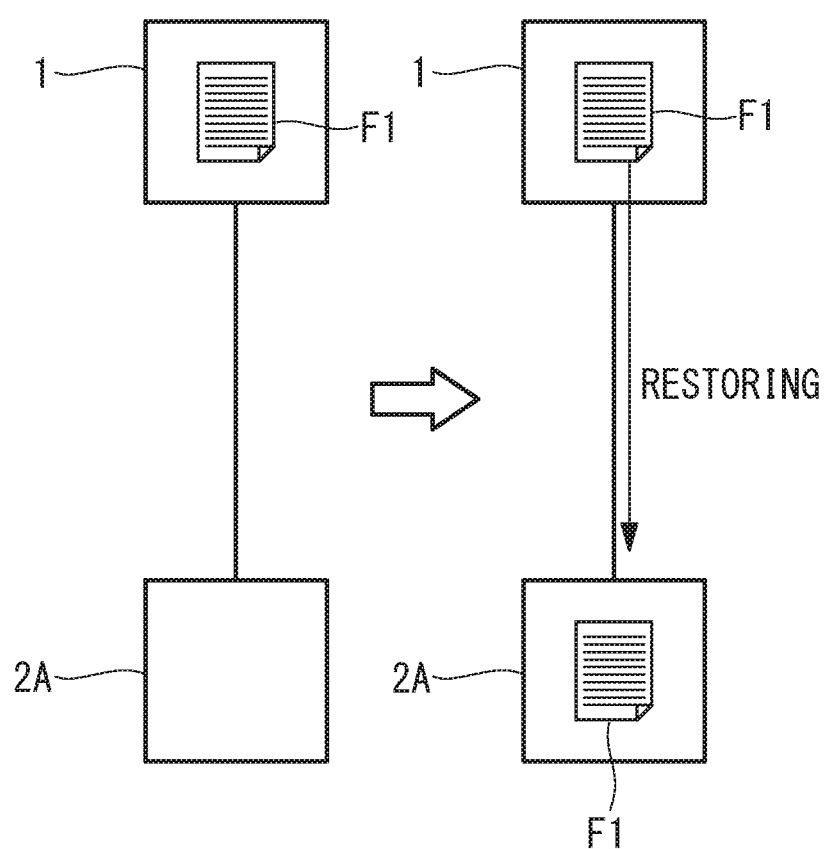

FILE MANAGEMENT DEVICE

CROSS-REFERENCE TO RELATED APPLICATIONS

This application claims the benefit of Japanese Patent Application No. 2019-095910, the content of which is incorporated herein by reference.

TECHNICAL FIELD

The present invention relates to a file management device.

BACKGROUND ART

In the related art, devices configured to automatically create backup files for electronic files stored in computerized numerical control (CNC) devices or the like for machine tools are known (see PTLs 1 to 3, for example).

CITATION LIST

Patent Literature

{PTL 1} Japanese Unexamined Patent Application, Publication No. 2009-070268
{PTL 2} Japanese Unexamined Patent Application, Publication No. 2018-018429
{PTL 3} Japanese Unexamined Patent Application, Publication No. 2000-020368

SUMMARY OF INVENTION

According to an aspect of the present disclosure, there is provided a file management device that is connected to a plurality of manufacturing machines or a plurality of robots through a communication network, the file management device including: an input unit to which a user inputs a file deletion command including a file name of files to be deleted; and a file deletion unit that causes the plurality of manufacturing machines or the plurality of robots to delete the files to be deleted with the same file name stored in the plurality of manufacturing machines or the plurality of robots in response to the file deletion command input through the input unit.

BRIEF DESCRIPTION OF DRAWINGS

FIG. 7A is a diagram for explaining processing for restoring a deleted file, and illustrates a process for inputting a file transmission command.
FIG. 7B is a diagram for explaining processing for restoring a deleted file, and illustrates a process for restoring the file.

DESCRIPTION OF EMBODIMENTS

Figure 1:
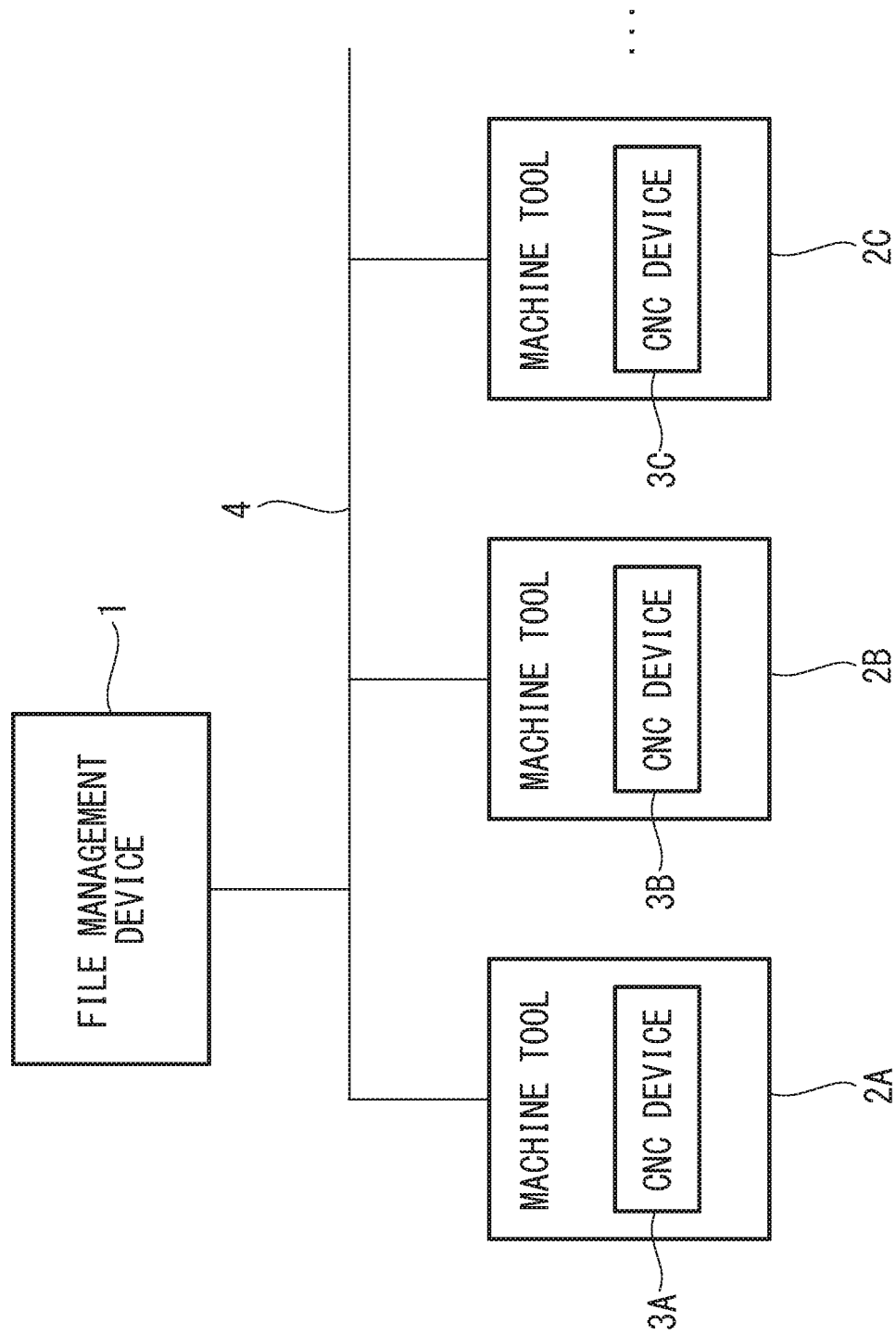
FIG. 1 is a configuration diagram of an example of a system that includes a file management device and a plurality of machine tools.
Figure 2:
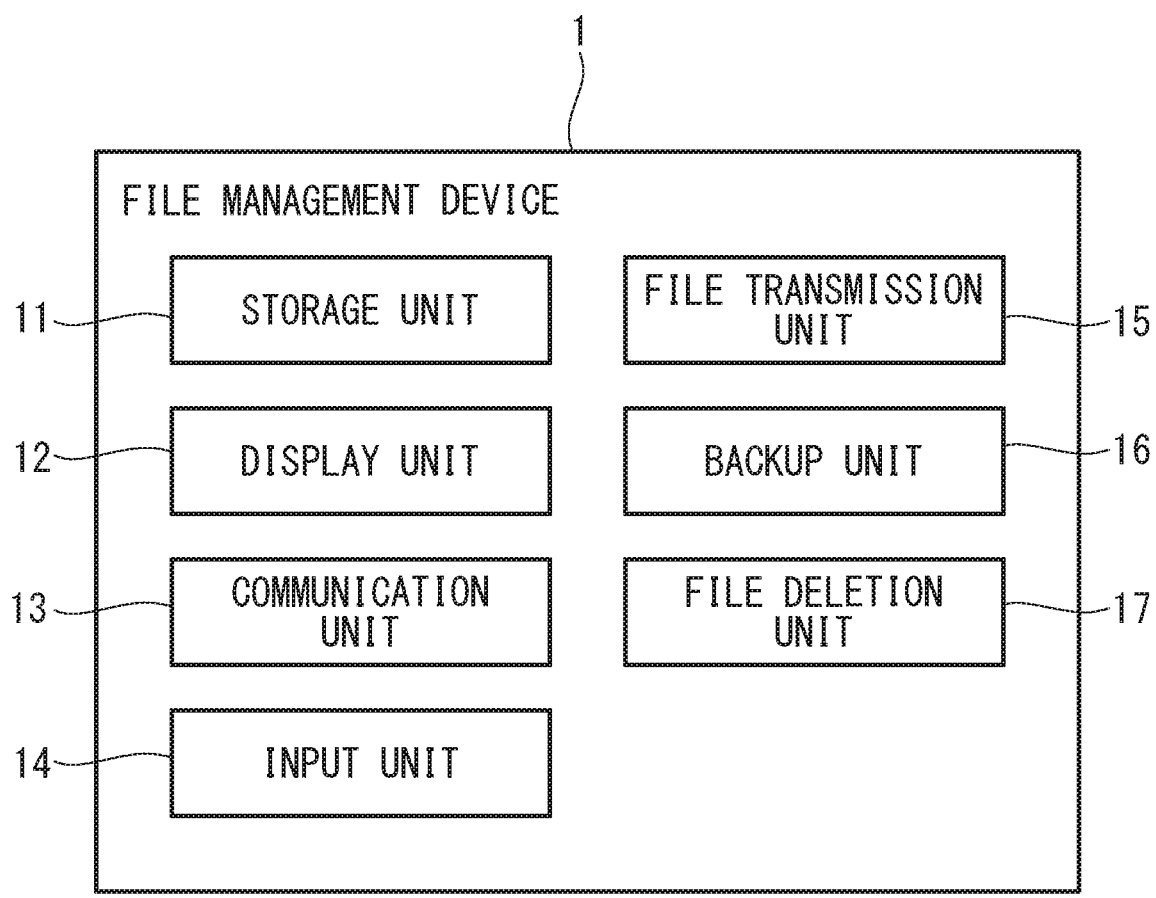
FIG. 2 is a block diagram illustrating a configuration of the file management device.

Hereinafter, a file management device 1 according to an embodiment will be described with reference to drawings.
The file management device 1 is connected to a plurality of machine tools (manufacturing machines) 2A, 2B, and 2C through a communication network 4 as illustrated in FIG. 1. The communication network 4 is, for example, a LAN, a WAN, or the Internet. The file management device 1 manages electronic files (hereinafter, simply referred to as files) stored in the plurality of machine tools 2A, 2B, and 2C in a remote manner by transmitting and receiving files and various requests to and from the plurality of machine tools 2A, 2B, and 2C via the communication network 4.
The machine tools 2A, 2B, and 2C are machining centers that include, for example, tool magazines holding a plurality of types of tools and have a function of automatically replacing the tools between spindles and the tool magazines. Computerized numerical control (CNC) devices 3A, 3B, and 3C of the respective machine tools 2A, 2B, and 2C include storage units (not illustrated) that have RAMs, ROMs, and the like, and the storage units store files necessary for operations of the machine tools 2A, 2B, and 2C, for example, files of working programs, files related to tool offset information, files related to work coordinate system setting, and the like. The plurality of machine tools 2A, 2B, and 2C are placed in a factory or the like of an EMS company that mass produces products of the same type, for example, and work workpieces in accordance with a same working program. Therefore, files of the same working program are stored in the CNC devices 3A, 3B, and 3C.
The file management device 1 is configured of, for example, a personal computer (PC) and an input device connected to the PC. The input device is, for example, a keyboard, a mouse, a touch panel, or a microphone.
The file management device 1 includes a storage unit 11, a display unit 12, a communication unit 13, an input unit 14, a file transmission unit 15, a backup unit 16, and a file deletion unit 17 as illustrated in FIG. 2. Processing performed by the file transmission unit 15, the backup unit 16, and the file deletion unit 17, which will be described later, are realized by a processor incorporated in the PC executing processing in accordance with a file management program, for example.
The storage unit 11 has a RAM, a ROM, and other storage devices. The storage unit 11 stores files input by a user to the file management device 1 and backup files that are files received from the machine tools 2A, 2B, and 2C as will be described later.
The display unit 12 is, for example, a display of the PC.
The communication unit 13 communicates with the CNC devices 3A, 3B, and 3C of the machine tools 2A, 2B, and 2C via the communication network 4, transmits files and various requests to the machine tools 2A, 2B, and 2C, and receives file from the machine tools 2A, 2B, and 2C.

The input unit 14 is adapted for the user to input commands related to operations for files in the CNC devices 3A, 3B, and 3C to the file management device 1 and is configured of any of the aforementioned input devices. The user can input a file transmission command and a file deletion command through an operation of the input unit 14. The file transmission command is a command for transmitting the same file from the file management device 1 to the plurality of machine tools 2A, 2B, and 2C and causing the machine tools 2A, 2B, and 2C to store the file. The file deletion command is a command for causing deletion of files with the same file name from the plurality of machine tools 2A, 2B, and 2C and includes the file name of the files to be deleted.

For example, the user can input the file transmission command by causing the display unit 12 to display a list of files in the storage unit 11 and selects one file from the list using a mouse. Also, the user can input the file deletion command by causing the display unit 12 to display a list of file names of files in the CNC devices 3A, 3B, and 3C and selecting one file name from the list using the mouse.

Figure 3:
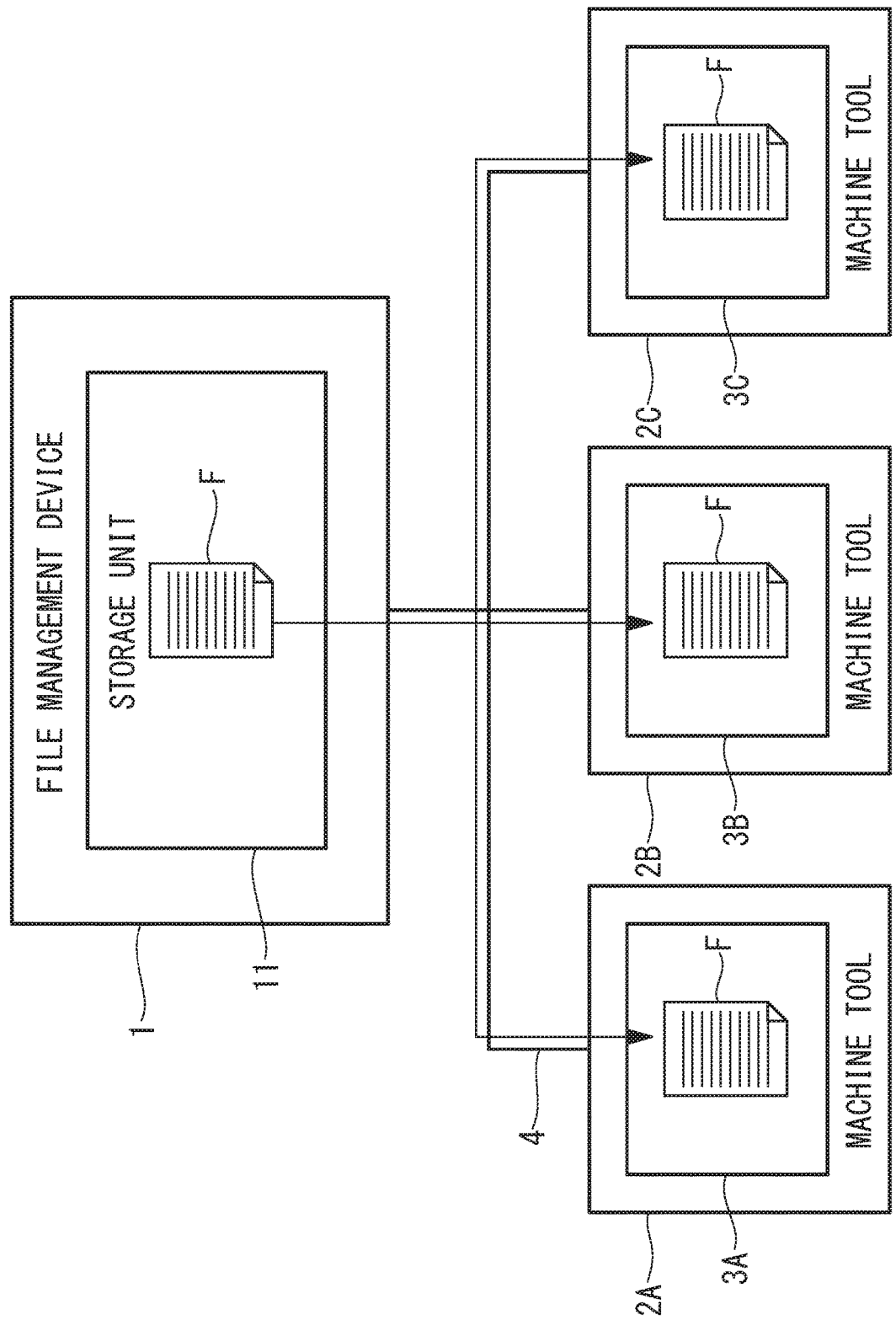
FIG. 3 is a diagram for explaining transmission of files from the file management device to the plurality of machine tools.

The file transmission unit 15 simultaneously transmits a file F in the storage unit 11 to the plurality of machine tools 2A, 2B, and 2C via the communication unit 13 and causes the CNC devices 3A, 3B, and 3C to store the file F in response to the file transmission command input to the input unit 14 as illustrated in FIG. 3. In this manner, the same file F is stored in the plurality of machine tools 2A, 2B, and 2C at the same time.

For example, the file transmission unit 15 reads the file F designated by the file transmission command from the storage unit 11 and simultaneously transmits the read file F along with a storage request to the plurality of machine tools 2A, 2B, and 2C. The machine tools 2A, 2B, and 2C stores the file F received from the file management device 1 in storage units of the CNC devices 3A, 3B, and 3C in accordance with the storage request.

Figure 4:
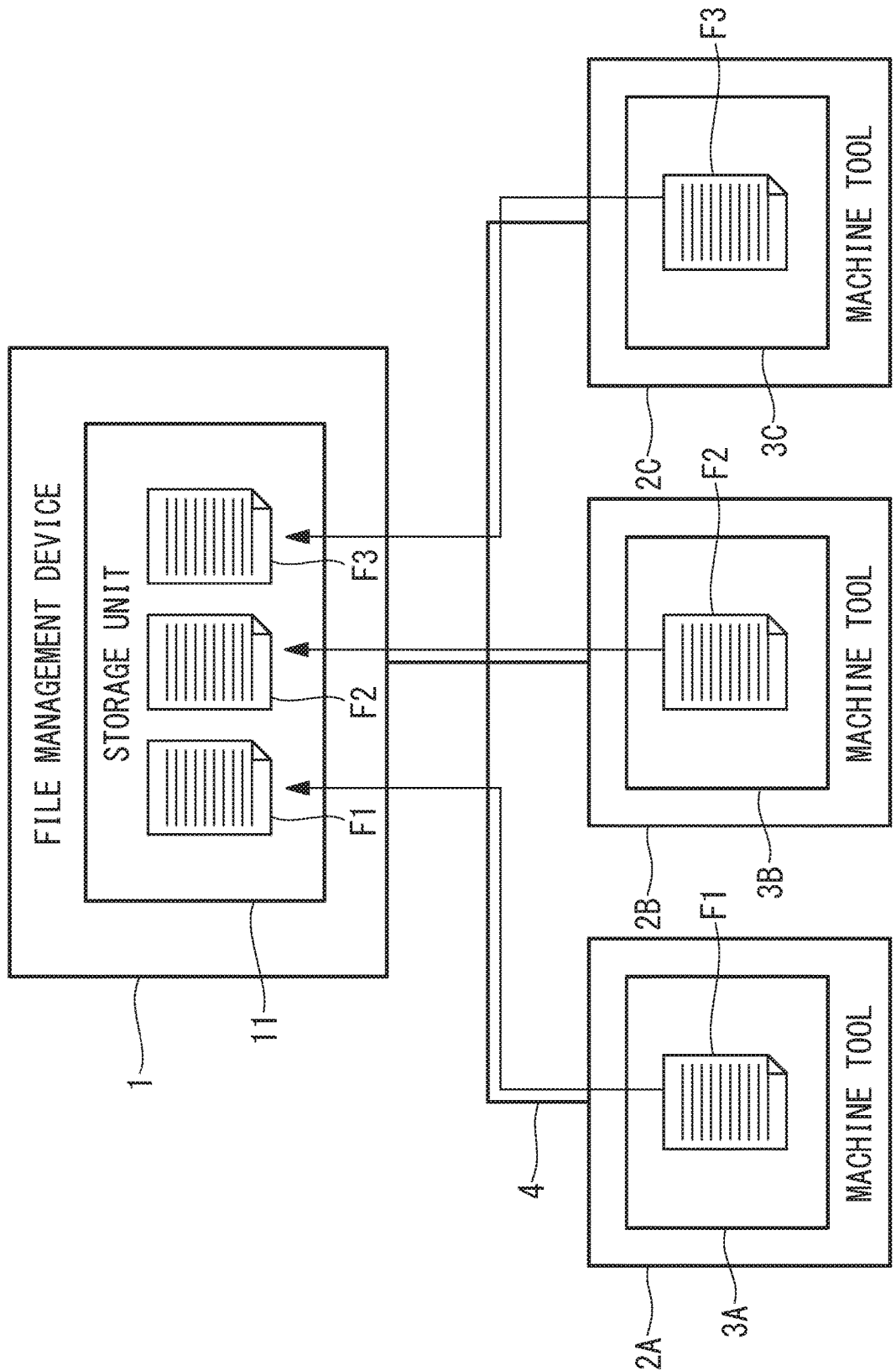
FIG. 4 is a diagram for explaining backup of files in the plurality of machine tools performed by the file management device.

The backup unit 16 creates, in the storage unit 11, backup files for files F1, F2, and F3 to be deleted that have the same file name and are stored in the machine tools 2A, 2B, and 2C, in response to the file deletion command input to the input unit 14 as illustrated in FIG. 4.

For example, the backup unit 16 simultaneously transmits, to the plurality of machine tools 2A, 2B, and 2C, a transmission request for requesting transmission of files with a file name included in the file deletion command. The machine tools 2A, 2B, and 2C transmit the files F1, F2, and F3, respectively, to the file management device 1 in accordance with the transmission request. The backup unit 16 acquires the files F1, F2, and F3 from the machine tools 2A, 2B, and 2C via the communication unit 13 and causes the storage unit 11 to store the files F1, F2, and F3. In this manner, backup files for the files F1, F2, and F3 to be deleted are created.

The file deletion unit 17 causes the plurality of machine tools 2A, 2B, and 2C to delete the files F1, F2, and F3 to be deleted, respectively, in response to the file deletion command input to the input unit 14.

For example, the file deletion unit 17 simultaneously transmits a deletion request for requesting deletion of the files with the file name included in the file deletion command to the plurality of machine tools 2A, 2B, and 2C. The respective machine tools 2A, 2B, and 2C delete the files F1, F2, and F3 in the CNC devices 3A, 3B, and 3C in accordance with the deletion request. In this manner, the files F1, F2, and F3 with the same file name stored in the plurality of machine tools 2A, 2B, and 2C are deleted at the same time.

Here, the file deletion unit 17 causes the machine tools 2A, 2B, and 2C to execute deletion of the files F1, F2, and F3 after the backup unit 16 completes creation of all backup files for the files F1, F2, and F3 to be deleted in the machine tools 2A, 2B, and 2C.

Figure 5:
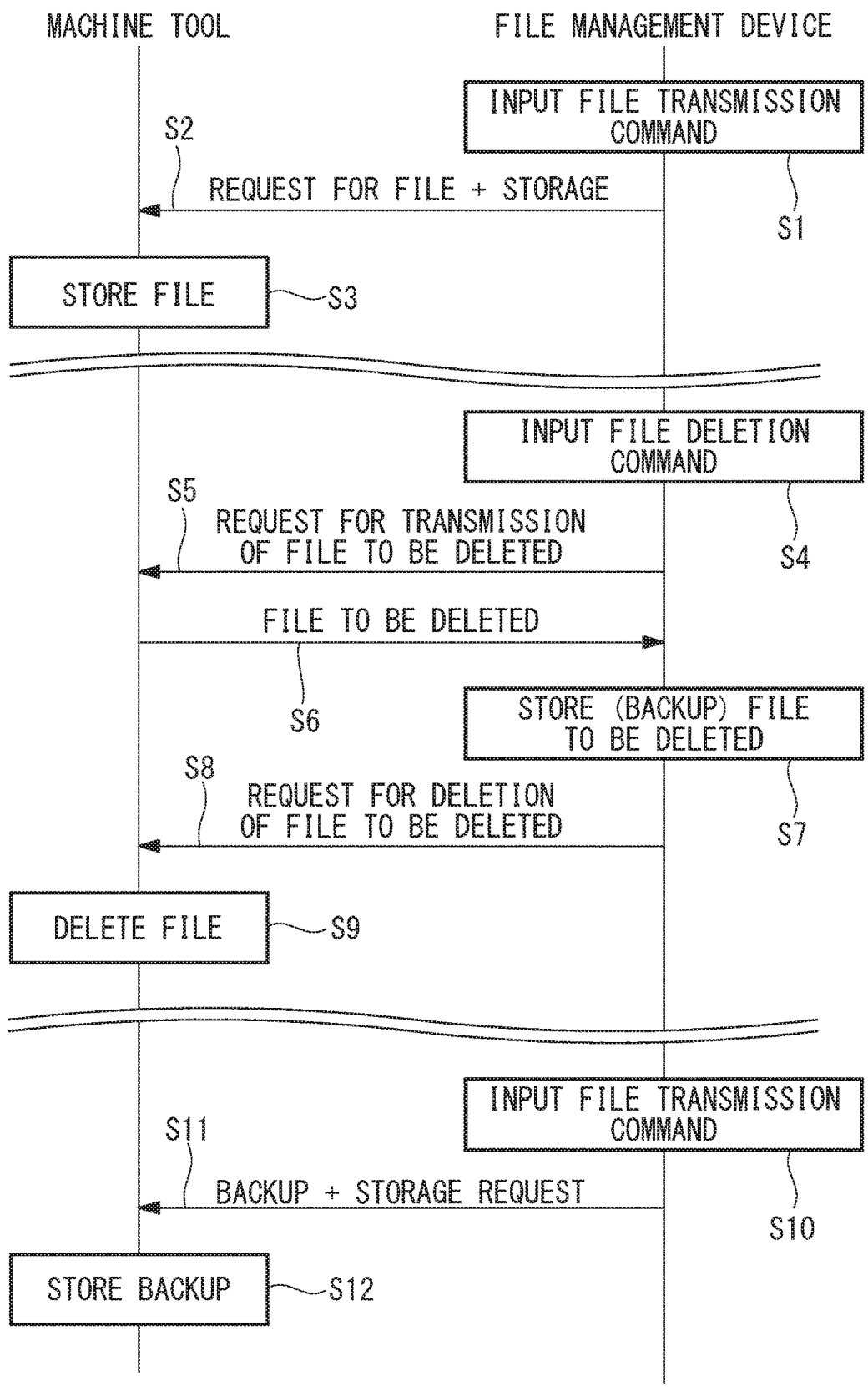
FIG. 5 is a sequence diagram for explaining operations of the file management device.

Next, an operation of the file management device 1 will be described with reference to FIGS. 5 to 7.

The user can operate files in the CNC device 3A, 3B, and 3C of the plurality of machine tools 2A, 2B, and 2C using the file management device 1.

In a case in which the user desires to cause the machine tools 2A, 2B, and 2C to store a file of a new working program, for example, the user causes the storage unit 11 of the file management device 1 to store the file of the working program and inputs a file transmission command for transmitting the file of the working program to the file management device 1 using the input unit 14 (Step S1). The file transmission unit 15 transmits the file of the working program in the storage unit 11 to the plurality of machine tools 2A, 2B, and 2C (Step S2) in response to the file transmission command and causes the CNC devices 3A, 3B, and 3C of the respective machine tools 2A, 2B, and 2C to store the file (Step S3). In this manner, the same file of the working program is stored in the plurality of machine tools 2A, 2B, and 2C at the same time.

In a case in which the user desires to delete files stored in the machine tools 2A, 2B, and 2C, the user inputs a file deletion command including a file name of the files to be deleted to the file management device 1 using the input unit 14 (Step S4).

Figure 6A:
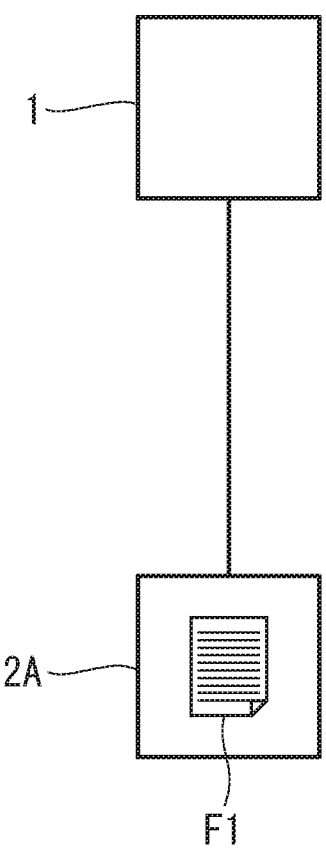
FIG. 6A is a diagram for explaining backup processing and deletion processing for a file to be deleted, and illustrates a process for inputting a file deletion command.
Figure 6B:
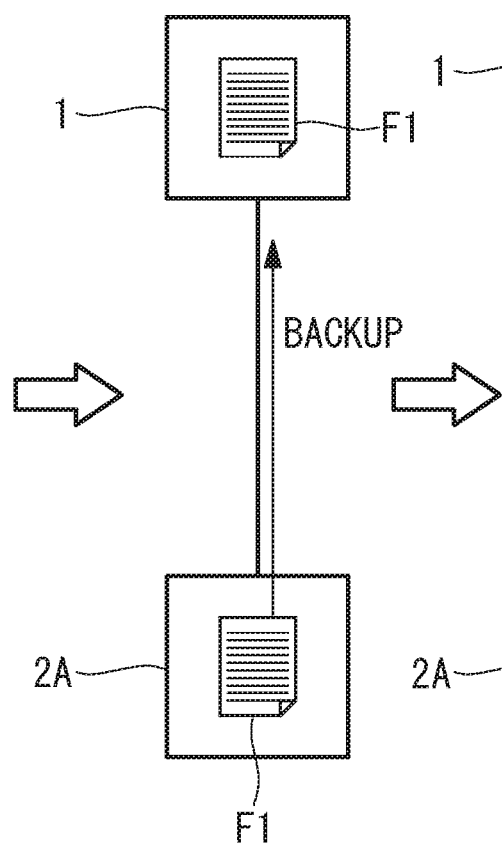
FIG. 6B is a diagram for explaining backup processing and deletion processing for a file to be deleted, and illustrates a process for backup of the file to be deleted.
Figure 6C:
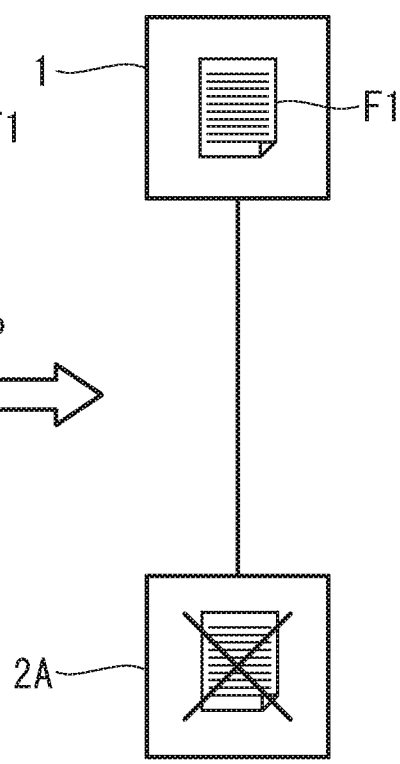
FIG. 6C is a diagram for explaining backup processing and deletion processing for a file to be deleted, and illustrates a process for deleting the file.

First, the backup unit 16 creates, in the storage unit 11, backup files for the files F1, F2, and F3 to be deleted as illustrated in FIG. 6A and FIG. 6B in response to the file deletion command. In other words, the backup unit 16 acquires the files F1, F2, and F3 to be deleted from the plurality of machine tools 2A, 2B, and 2C, respectively (Steps S5 and S6), and causes the storage unit 11 to store the acquired files F1, F2, and F3 to be deleted as backup files (Step S7). After the creation of the backup files is completed, then the file deletion unit 17 causes the machine tools 2A, 2B, and 2C to delete the files F1, F2, and F3 to be deleted stored in the machine tools 2A, 2B, and 2C as illustrated in FIG. 6C (Steps S8 and S9).

The user can restore the files F1, F2, and F3 deleted from the machine tools 2A, 2B, and 2C in the plurality of machine tools 2A, 2B, and 2C through an operation of the file management device 1.

In other words, the user inputs a file transmission command including the file name of the files F1, F2, and F3 to be restored to the file management device 1 using the input unit 14 (Step S10). The file transmission unit 15 transmits the backup files F1, F2, and F3 stored in the storage unit 11 to the plurality of machine tools 2A, 2B, and 2C (Step S11) and causes the CNC devices 3A, 3B, and 3C of the respective machine tools 2A, 2B, and 2C to store the backup files F1, F2, and F3 (Step S12) as illustrated in FIG. 7A and FIG. 7B in response to the file transmission command. In this manner, the files F1, F2, and F3 with the same file name deleted in the past are restored in the plurality of machine tools 2A, 2B, and 2C at the same time.

In this manner, the user can cause the plurality of machine tools 2A, 2B, and 2C to store the same files at the same time and delete the files with the same file name from the plurality of machine tools 2A, 2B, and 2C at the same time through operations of the single file management device 1. Tasks for storing or deleting files by operating the plurality of machine tools 2A, 2B, and 2C one by one impart a large burden on the user. According to the embodiment, it is possible to significantly reduce the amount and the time period for the user's tasks required for managing files in the plurality of machine tools 2A, 2B, and 2C.

Also, backup files for files to be deleted are automatically created in the file management device 1 before the files stored in the plurality of machine tools 2A, 2B, and 2C are deleted at the same time. Therefore, the user can easily restore the deleted files in the plurality of machine tools 2A, 2B, and 2C by transmitting backup files in the file management devices 1 to the plurality of machine tools 2A, 2B, and 2C at the same time when it is necessary to restore the deleted files, for example, in a case in which the files in the machine tools 2A, 2B, and 2C are erroneously deleted at the same time.

Also, the backup files are created in the file management device 1 instead of the CNC devices 3A, 3B, and 3C of the machine tools 2A, 2B, and 2C. Therefore, it is possible to reduce storage capacities in the CNC devices 3A, 3B, and 3C as compared with a case in which the backup files are created in the CNC devices 3A, 3B, and 3C.

Also, the user may add some changes to content of the files stored in the CNC devices 3A, 3B, and 3C. For example, modifications may be added to the working program in accordance with workpiece working results and the like of the machine tools 2A, 2B, and 2C. According to the embodiment, backup files for the latest files immediately before deletion are created. In other words, it is possible to create backup files that are more useful for the user.

Although the backup unit 16 creates the backup files in response to the file deletion command from the user in the aforementioned embodiment, the backup unit 16 may periodically create backup files for files stored in the machine tools 2A, 2B, and 2C instead. For example, the backup unit 16 may create backup files at a predetermined time of a day or on a predetermined day of week in accordance with a schedule set in advance by the user. Also, the backup unit 16 may create backup files for files with a file name set in advance by the user.

It may take a long time to create the backup files such as in a case in which the number of the machine tools 2A, 2B, and 2C is large and in a case in which sizes of the files to be deleted are large. It is not necessary to perform backup immediately before deletion of the files by periodically creating the backup files. Therefore, it is possible to quickly start the deletion of the files in the machine tools 2A, 2B, and 2C after the user inputs the file deletion command.

In this case, the backup unit 16 may check whether or not content of the files to be deleted in the respective machine tools 2A, 2B, and 2C is the same as content of the corresponding backup files in the storage unit 11, in response to the file deletion command.

Whether or not the content of the files to be deleted is the same as the content of the backup files is determined through comparison of last update date and times of both the files to be deleted and the backup files or through comparison of the content of both the files to be deleted and the backup files. In a case in which the content is the same, then the file deletion unit 17 executes deletion of the files. On the other hand, when the content is not the same, the backup unit 16 creates or updates the backup files for the files to be deleted, and the file deletion unit 17 then executes the deletion of the files.

In this manner, it is possible to create backup files for the latest files to be deleted in a case in which the content of the files to be deleted in the machine tools 2A, 2B, and 2C have been changed by the user after the last backup.

In the aforementioned embodiment, the backup unit 16 preferably creates the respective backup files in association with the corresponding machine tool 2A, 2B, or 2C. For example, the respective machine tools 2A, 2B, and 2C have unique identification information. The backup unit 16 acquires the identification information along with the files to be deleted from the respective machine tools 2A, 2B, and 2C and causes the storage unit 11 to store the files and the identification information in a mutually associated manner.

When backup files are to be transmitted to the machine tools 2A, 2B, and 2C for restoring deleted files, the file transmission unit 15 transmits the respective backup files to the corresponding machine tool 2A, 2B, or 2C on the basis of the identification information, for example.

As described above, the user may add some changes to the files stored in the machine tools 2A, 2B, and 2C. Therefore, content of the files acquired from the plurality of machine tools 2A, 2B, and 2C for the purpose of back-up may differ from each other regardless of the same file name. It is possible to restore the files with content that is the same as the content of the files before deletion in the respective machine tools 2A, 2B, and 2C by associating the backup files with the corresponding machine tool 2A, 2B, or 2C.

In the aforementioned embodiment, there may be a case in which it is desired to overwrite files in the machine tools 2A, 2B, and 2C with new files, for example, a case in which it is desired to add the same change to the working program in the plurality of machine tools 2A, 2B, and 2C. In a case in which files with a file name that is the same as a file name of a file to be transmitted have already existed in the machine tools 2A, 2B, and 2C, the file transmission unit 15 may overwrite the existing files with the files to be transmitted. In this case, the backup unit 16 may create backup files for the existing files before the overwriting.

In the aforementioned embodiment, the backup unit 16 may determine whether or not it is possible to create backup files on the basis of a free space in the storage unit 11 required to create the backup files and a current free space in the storage unit 11 before starting the creation of the backup files.

For example, the backup unit 16 acquires information regarding the sizes of the files to be deleted from the respective machine tools 2A, 2B, and 2C and calculates the free space required to create the backup files from the total size of the files to be deleted. In a case in which the required free space is equal to or smaller than the current free space, the backup unit 16 determines that it is possible to create the backup files and starts to create the backup files. On the other hand, in a case in which the required free space is larger than the current free space, the backup unit 16 determines that it is not possible to create the backup files due to shortage of the free space.

Figure 8:
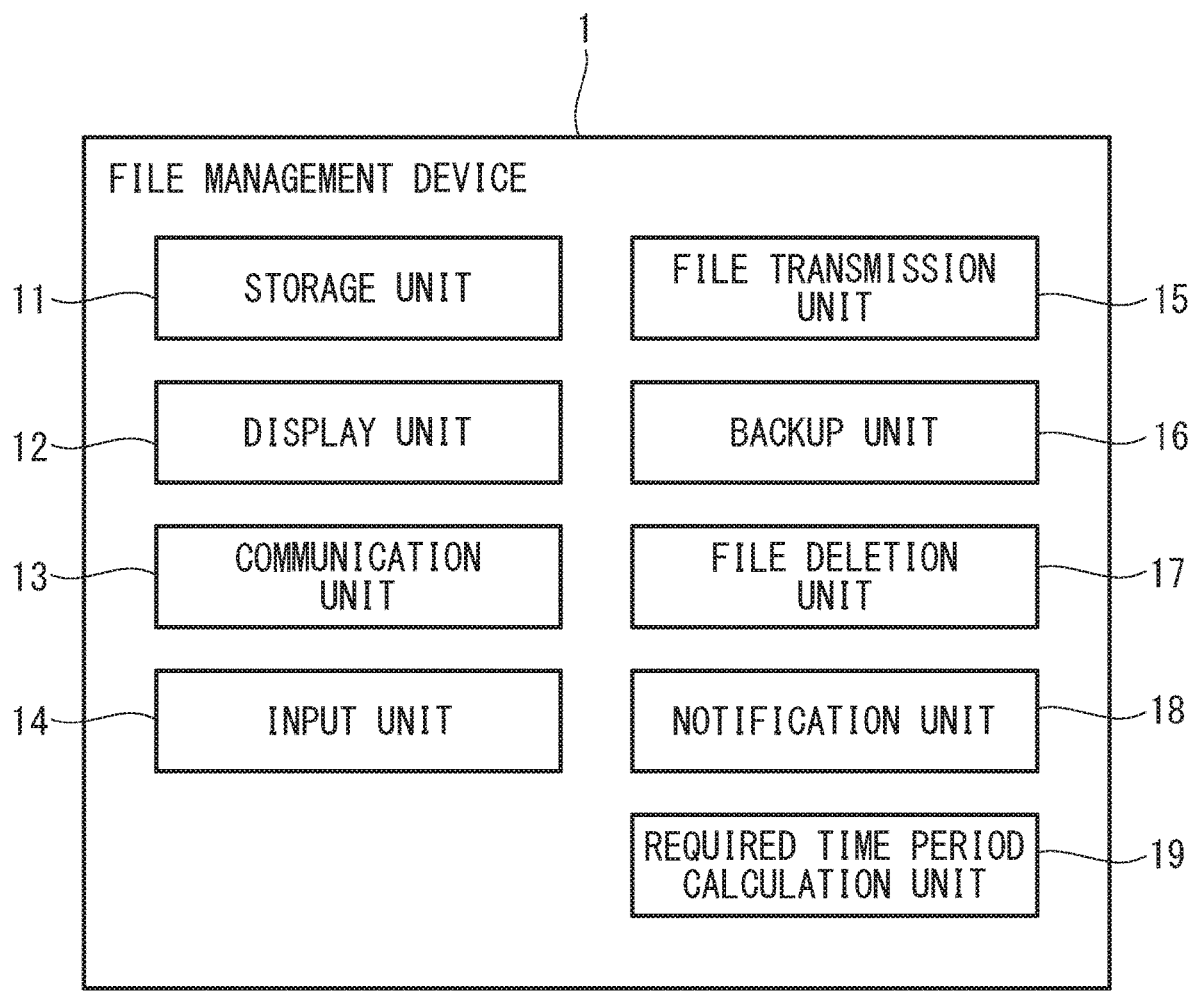
FIG. 8 is a block diagram illustrating a configuration of another example of a file management device.

In this case, the file management device 1 preferably further includes a notification unit 18 that provides a notification that the free space in the storage unit 11 is not sufficient to the user as illustrated in FIG. 8.

The notification unit 18 creates a notification message for notification about the shortage of the free space and causes the display unit 12 to display the notification message. The notification unit 18 may provide a notification for requesting deletion of files stored in the storage unit 11 to the user in addition to the shortage of the free space in the storage unit 11. Also, the notification unit 18 may provide a notification regarding the free space in the storage unit 11 required to create the backup files and the current free space in the storage unit 11 to the user.

In the aforementioned embodiment, the file management device 1 may further include a required time period calculation unit 19 that calculates a required time period that is necessary to create the backup files, and the display unit 12 may display the required time period calculated by the required time period calculation unit 19 as illustrated in FIG. 8.

The length of the required time period that is necessary to create the backup files differs depending on the sizes and the like of the files to be deleted, and therefore, a length of time period until deletion of the files in the machine tools 2A, 2B, and 2C is completed after the user inputs the file deletion command also differs.

The user can predict an end time of the deletion of the files on the basis of the required time period displayed on the display unit 12. Also, since it is preferable not to allow the machine tools 2A, 2b, and 2C to operate during the backup in which the files are transmitted from the machine tools 2A, 2B, and 2C to the file management device 1, the user may temporarily stop operations of the machine tools 2A, 2B, and 2C. In such a case, the user can predict the time at which the operations of the machine tools 2A, 2B, and 2C can be restarted, on the basis of the required time period displayed on the display unit 12.

The required time calculation unit 19 may calculate a remaining time period for creating the backup files and may cause the display unit 12 to display the remaining time period. The user can recognize that the backup of the files is being executed on the basis of the remaining time period displayed on the display unit 12.

The file management device 1 may cause display units of the respective machine tools 2A, 2B, and 2C to display the required time period or the remaining time period calculated by the required time period calculation unit 19. Transmission and reception of files between the respective machine tools 2A, 2B, and 2C and the file management device 1 compete with transmission of files to be deleted for backup. It is possible to notify users of the respective machine tools 2A, 2B, and 2C of the fact that backup of the files to be deleted is being executed and to encourage the users of the machine tools 2A, 2B, and 2C to choose appropriate measures such as waiting for transmission and reception of files between the machine tools 2A, 2B, and 2C and the file management device 1, by causing the display units of the respective machine tools 2A, 2B, and 2C to display the required time period or the remaining time period for the backup.

In the aforementioned embodiment, the backup unit 16 may also create backup files of other files in accordance with content of the working program when backup files for the file of the working program are to be created.

In one example in which tools used for working differ among the plurality of machine tools 2A, 2B, and 2C, the backup unit 16 may acquire files of tool data along with the files of the working program from the respective machine tools 2A, 2B, and 2C and cause the storage unit 11 to store the files of the working program and the files of the tool data in a mutually associated manner. In another example in which workpiece coordinate systems differ among the plurality of machine tools 2A, 2B, and 2C, the backup unit 16 may acquire files related to workpiece coordinate system setting along with the files of the working program from the respective machine tools 2A, 2B, and 2C and cause the storage unit 11 to store the files of the working program and the files related to the workpiece coordinate system setting in a mutually associated manner.

In the aforementioned embodiment, in a case in which the files acquired from the plurality of machine tools 2A, 2B, and 2C include two or more files with the same content, the backup unit 16 may create a single backup file as a backup file for the two or more files.

According to the configuration, it is possible to prevent a backup file with the same content from being created in an overlapping manner and to save the amount of use in the storage unit 11.

Figure 9:
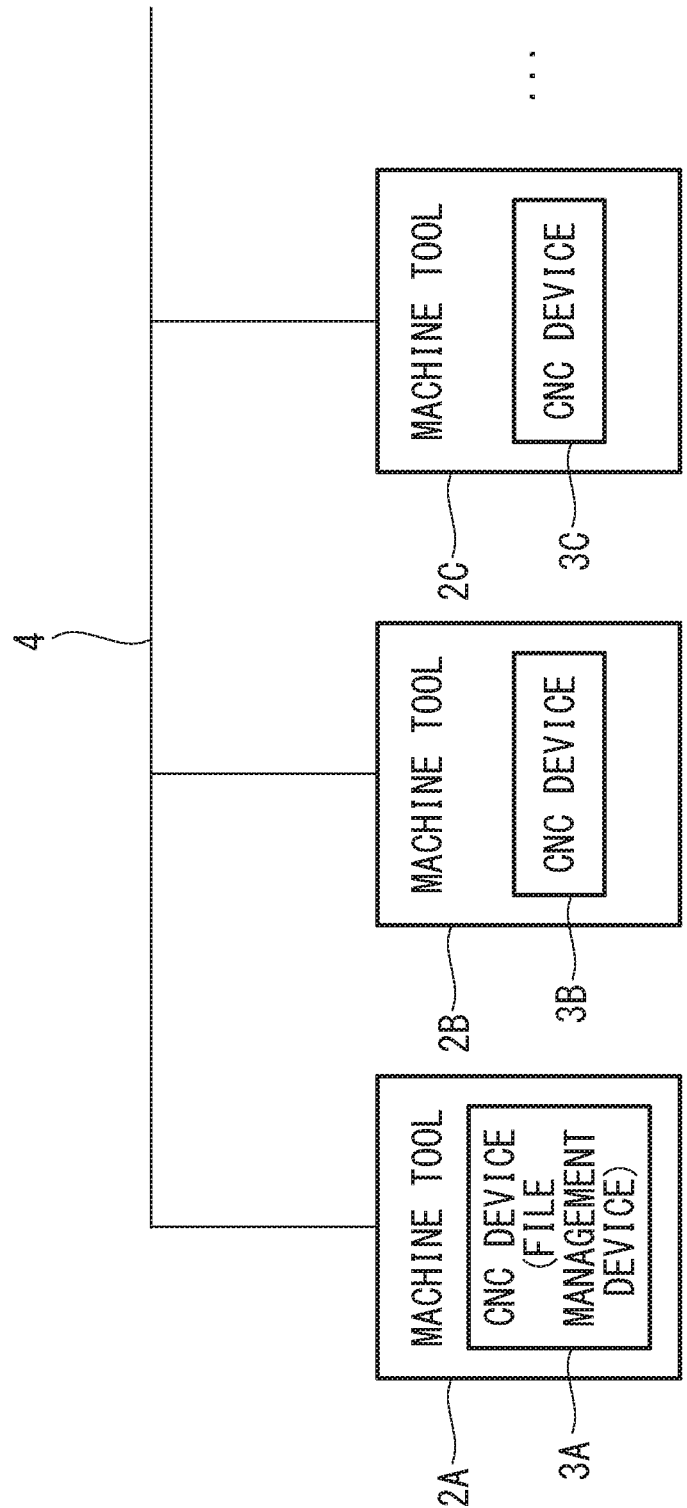
FIG. 9 is a configuration diagram of another example of a system that includes a file management device and a plurality of machine tools.

Although the file management device 1 is a device that is different from the plurality of machine tools 2A, 2B, and 2C in the aforementioned embodiment, a CNC device 3A of one of the plurality of machine tools 2A, 2B, and 2C, namely the machine tool 2A may serve as the file management device 1 instead as illustrated in FIG. 9.

In this case, the CNC device 3A that serves as the file management device 1 is connected to all the other machine tools 2B and 2C through the communication network 4.

Although the file management device 1 is connected to the plurality of machine tools 2A, 2B, and 2C in the aforementioned embodiment, the file management device 1 may be connected to a manufacturing machine of another type used for working or manufacturing a workpiece, such as an injection molding machine, a wire electrical discharge machine, a press working machine, or the like instead.

In the aforementioned embodiment, the file management device 1 may be connected to a plurality of robots that operate in accordance with the same operation program. In a case in which manufacturing machines and robots operate in combination, the file management device 1 may be connected to the plurality of manufacturing machines and the plurality of robots. In this case, the file management device 1 executes backup, deletion, and restoring of files in control devices of the plurality of robots similarly to the backup, the deletion, and the restoring of files in the CNC devices 3A, 3B, and 3C of the plurality of machine tools 2A, 2B, and 2C.

REFERENCE SIGNS LIST

1 File management device
2A, 2B, 2C Machine tool (manufacturing machine)
3A, 3B, 3C Numerical control device
4 Communication network
11 Storage unit
12 Display unit
13 Communication unit
14 Input unit
15 File transmission unit
16 Backup unit
17 File deletion unit
18 Notification unit
19 Required time period calculation unit
F, F1, F2, F3 File

The invention claimed is:
1. A file management device comprising:
a processor configured to communicate with a plurality of manufacturing machines or a plurality of robots outside of the file management device and which share and store files; and
an input device which receives a file deletion command including a file name, the file name indicating a same file to be deleted from each of the plurality of manufacturing machines or the plurality of robots;

wherein the processor is further configured to simultaneously transmit, to each of the plurality of manufacturing machines or the plurality of robots, a deletion request for causing each of the plurality of manufacturing machines or the plurality of robots to simultaneously delete the indicated file in response to the file deletion command being received by the input device.

2. The file management device according to claim 1, further comprising:
a storage; and
wherein the processor is configured to create, in the storage, backup files for the files stored in the plurality of manufacturing machines or the plurality of robots.

3. The file management device according to claim 2, wherein the processor is configured to:
create a backup file for the indicated file in response to the file deletion command being received by the input device; and
transmit the deletion request to each of the plurality of manufacturing machines or the plurality of robots after a completion of creating the backup file.

4. The file management device according to claim 2, wherein the processor is configured to periodically create the backup files.

5. The file management device according to claim 4, wherein the processor is configured to check whether or not content of the indicated file stored in the plurality of manufacturing machines or the plurality of robots is a same content of a backup file for the indicated file stored in the storage in response to the file deletion command being received by the input device, and in a case in which the content is not the same, create or update the backup file for the indicated file.

6. The file management device according to claim 2, wherein the processor is configured to create respective backup files in association with a corresponding manufacturing machines or the robots.

7. The file management device according to claim 2, wherein the input device receives a file transmission command for transmitting the files stored in the storage, and
the processor is configured to transmit the backup files stored in the storage to the plurality of manufacturing machines or the plurality of robots and cause the plurality of manufacturing machines or the plurality of robots to store the backup files, in response to the file transmission command being received by the input device.

8. The file management device according to claim 7, wherein the processor is configured to:
create respective backup files in association with a corresponding manufacturing machines or the robots; and
transmit the respective backup files to the corresponding manufacturing machines or the robots and cause the manufacturing machines or the robots to store the backup files.

9. The file management device according to claim 7, wherein the processor is configured to:
in a case in which files with a file name that is the same as a file name of a file to be transmitted exists in the plurality of manufacturing machines or the plurality of robots, overwrite existing files with the file to be transmitted; and
create backup files for the existing files before the overwriting.

10. The file management device according to claim 2, wherein the processor is configured to:
determine whether or not it is possible to create the backup files on a basis of a free space in the storage required to create the backup files and a current free space in the storage; and
provide, to a user, a notification that the free space in the storage is not sufficient in a case in which it is determined that it is not possible to create the backup files.

11. The file management device according to claim 2 further comprising:
a display,
wherein the processor is configured to calculate a required time period that is necessary to create the backup files and cause the display to display the calculated required time period.

12. The file management device according to claim 2, wherein the file management device is connected to the plurality of manufacturing machines, and
the processor is configured to create at least one of backup files for a file of a working program, a file related to tool offset information, and a file related to work coordinate system setting.

13. The file management device according to claim 12, wherein the processor is configured to create a backup file for another file in accordance with content of the working program when creating the backup file for the file of the working program.

14. The file management device according to claim 2, wherein in a case in which the indicated file stored in the plurality of manufacturing machines or the plurality of robots include two or more files with a same content, the processor is configured to create a single backup file as a backup file for the two or more files.

* * * * *